United States Patent
Bennett et al.

(10) Patent No.: US 8,750,828 B2
(45) Date of Patent: *Jun. 10, 2014

(54) ENABLING REMOTE AND ANONYMOUS CONTROL OF MOBILE AND PORTABLE MULTIMEDIA DEVICES FOR SECURITY, TRACKING AND RECOVERY

(71) Applicant: Broadcom Corporation, Irvine, CA (US)

(72) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,641

(22) Filed: Mar. 11, 2013

(65) Prior Publication Data

US 2013/0203387 A1    Aug. 8, 2013

Related U.S. Application Data

(63) Continuation of application No. 12/323,352, filed on Nov. 25, 2008, now Pat. No. 8,401,521.

(51) Int. Cl.
*H04M 1/66* (2006.01)

(52) U.S. Cl.
USPC ........ 455/410; 455/411; 455/418; 455/414.3; 455/41.2; 725/25

(58) Field of Classification Search
USPC ........ 455/404.2, 144, 141.1, 141.2, 420, 425, 455/456.2, 456.3, 456.6, 419, 410–414.4; 709/217, 203–206; 702/188; 379/32.01
See application file for complete search history.

(56) References Cited

U.S. PATENT DOCUMENTS

| | | | |
|---|---|---|---|
| 6,026,293 A | 2/2000 | Osborn | |
| 6,167,358 A | 12/2000 | Othmer et al. | |
| 6,621,895 B1 | 9/2003 | Giese | |
| 6,671,508 B1 | 12/2003 | Sugano et al. | |
| 7,409,428 B1 * | 8/2008 | Brabec et al. | 709/206 |
| 7,561,868 B2 * | 7/2009 | Jordan, Jr. | 455/412.2 |
| 7,920,845 B2 * | 4/2011 | Myllynen et al. | 455/410 |
| 8,131,264 B2 * | 3/2012 | Barker et al. | 455/412.1 |
| 8,131,281 B1 * | 3/2012 | Hildner et al. | 455/418 |
| 2002/0110246 A1 * | 8/2002 | Gosior et al. | 381/2 |

(Continued)

OTHER PUBLICATIONS

Verizon Wireless, Your Guide to plans, pricing, latest phones and more; 12 ways to make it yours!, p. 46-47, Fall 2008.

*Primary Examiner* — Sharad Rampuria

(74) *Attorney, Agent, or Firm* — Brinks Gilson & Lione

(57) ABSTRACT

Aspects of the invention comprise a remote tracking and control server operable to transparently activate control of resources and to monitor operations on a target handheld communication device utilizing code installed on the handheld device. The resources may comprise a camera, microphone, GPS receiver, input device, display, speaker, wireless and/or wire-line transmitter and/or receiver. The monitoring and/or controlling activity is protected from interruption. The handheld device may be accessed by a securely stored unique identifier. Access to the controlling function and/or the resources by a user of the handheld device may be restricted. Monitored information is stored on the handheld device and communicated to the tracking server. The control server may receive monitored information from the handheld device whenever the device is coupled to a communication network. Monitoring may be initiated based on detected motion, sound, user input, video and/or touch.

20 Claims, 5 Drawing Sheets

(56) References Cited

U.S. PATENT DOCUMENTS

| | | |
|---|---|---|
| 2003/0105859 A1 | 6/2003 | Garnett et al. |
| 2003/0216143 A1 | 11/2003 | Roese et al. |
| 2006/0021032 A1 | 1/2006 | Challener et al. |
| 2006/0140350 A1* | 6/2006 | Jorasch et al. ............ 379/32.01 |
| 2006/0159250 A1* | 7/2006 | Marschall et al. ....... 379/211.02 |
| 2006/0183460 A1 | 8/2006 | Srinivasan et al. |
| 2006/0276172 A1 | 12/2006 | Rydgren et al. |
| 2007/0226704 A1* | 9/2007 | Nichols ......................... 717/131 |
| 2009/0112996 A1 | 4/2009 | Baker et al. |
| 2013/0298152 A1* | 11/2013 | Kellerman et al. ............. 725/25 |

* cited by examiner

ENABLING REMOTE AND ANONYMOUS CONTROL OF MOBILE AND PORTABLE MULTIMEDIA DEVICES FOR SECURITY, TRACKING AND RECOVERY

1. CROSS REFERENCE TO RELATED APPLICATIONS

This application is a continuation of application Ser. No. 12/323,352, filed Nov. 25, 2008, issued as U.S. Pat. No. 8,401,521 on Mar. 19, 2013, which is hereby incorporated herein by this reference.

2. TECHNICAL FIELD

Certain embodiments of the invention relate to communication systems. More specifically, certain embodiments of the invention relate to enabling remote and anonymous control of mobile and portable multimedia devices for security, tracking and recovery.

3. BACKGROUND

For many people, utilizing a plurality of mobile or stationary electronic devices has become a part of everyday life. Mobile devices have evolved from a convenient method for voice communication to multi-functional resources that offer, for example, still and moving image features, media playback, electronic gaming, Internet browsing, and email. Cellular phones with built-in cameras, or camera phones, have become prevalent in the mobile phone market, due to the low cost of CMOS image sensors and the ever increasing customer demand for more advanced cellular phones. Moreover, an increasing number of electronic devices are enabled to determine their geographic location. For example, various communication devices, such as a mobile phone, may comprise an integrated global navigation satellite system (GNSS) receiver. Alternatively, various portable devices may interface with an external GNSS receiver. In this regard, a handheld computer may be coupled to a GPS receiver via a connector, a communication cable or dongle, or via a wireless connection such as a Bluetooth connection. Regardless of whether a GNSS receiver is integrated or external, it may be enabled to acquire a position fix autonomously or may utilize the assistance of a ground based satellite reference system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for enabling remote and anonymous control of mobile and portable multimedia devices for security, tracking and recovery, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Certain embodiments of the invention can be found in a method and system for enabling remote and anonymous control of mobile and portable multimedia devices for security, tracking and recovery. In various embodiments of the invention, a first communication device, for example, a tracking and control server and/or another handheld communication device, activates control of resources on a handheld communication device, for example a mobile phone, to monitor one or more operations handled by the handheld communication device. In this regard, the monitoring may be transparent to a user of the handheld communication device. The monitoring is operable to occur without knowledge of a user of the handheld communication device. An owner of said first communication device installs executable code on the handheld communication device, without knowledge of the user of the handheld communication device, to enable the controlling and monitoring.

The handheld communication device may be accessed by a unique identifier of the device. In addition, the unique identifier may be securely stored within the handheld communication device. The controlling of the handheld device may be protected or access restricted. Furthermore, during the monitoring, control of the resources on the handheld communication device by a user of the device may be restricted. One or more functions which operate on the handheld communication device, for the monitoring, may prevent unauthorized interruption of the monitoring. The first communication device may remotely activate control of one or more resources or devices on the handheld communication device, for example, a camera, a microphone, a GPS receiver, an input device, a display, a speaker, a wireless and/or wire-line transmitter and/or receiver. The remote controlling of the one or more devices may be based on a profile, for example, a user profile and/or a device profile. The first communication device may receive surveillance information from the handheld communication device in response to the activation of resource control. The received surveillance information may comprise an identity of the handheld device. The surveillance information may be received from the device whenever the device is communicatively coupled to a communication network. In addition, the one or more resources on the handheld device may be configured to communicate information related to a detected activity, for example, motion, sound, user input, video and/or audio to the first communication device. In various embodiments of the invention, control of the handset resources may be activated via an SMS message sent from another handheld device and/or via a message sent by a service provider. In this manner, a first device may remotely activate control of resources on a handheld communication device.

Figure 1:
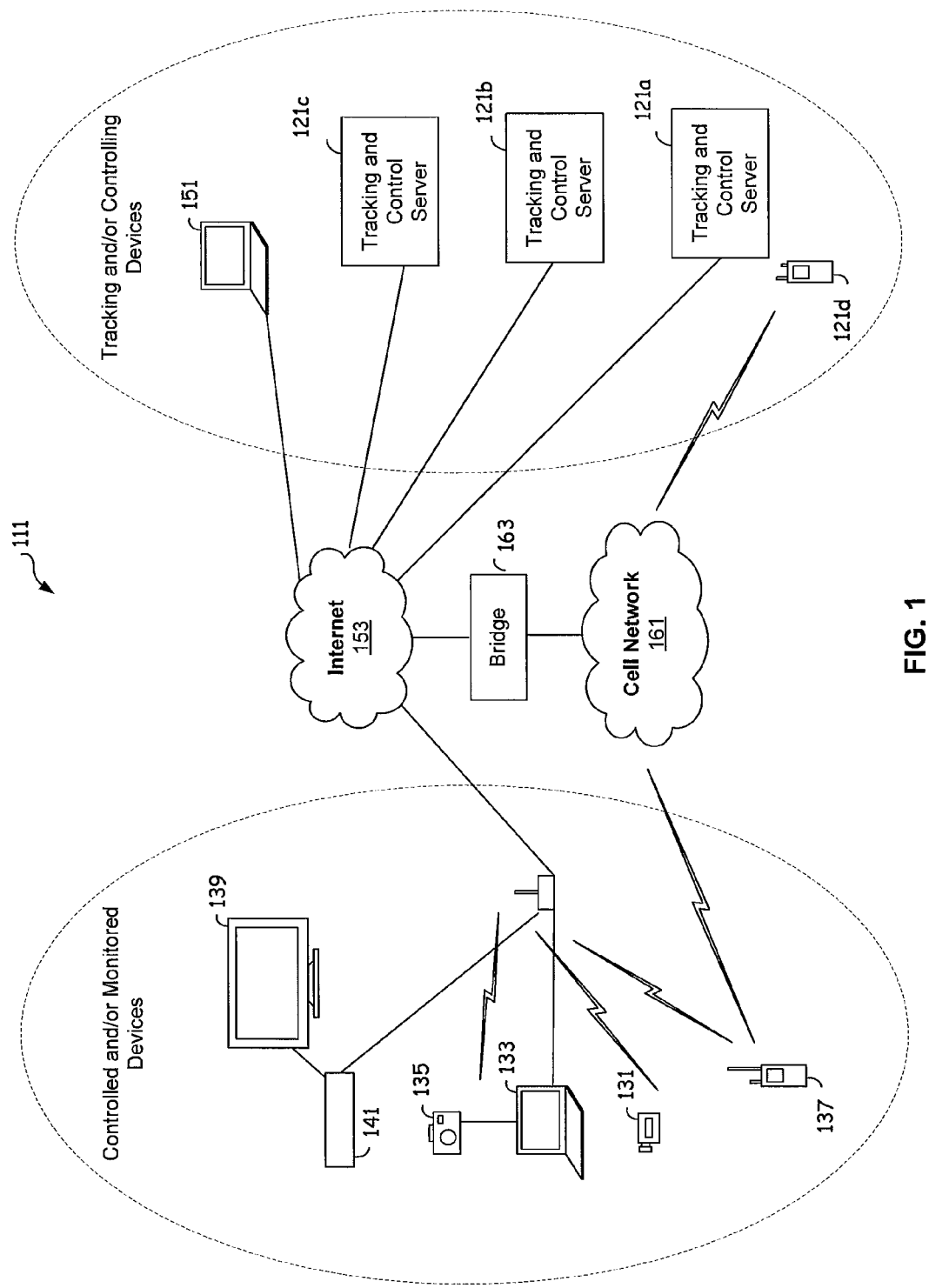
FIG. 1 is a block diagram illustrating an exemplary system for online control of interface resources on one or more endpoint devices, in accordance with an embodiment of the invention.

FIG. 1 is a block diagram illustrating an exemplary system for online control of interface resources on one or more endpoint devices, in accordance with an embodiment of the invention. Referring to FIG. 1, there is shown a plurality of tracking and control servers 121a, 121b, 121c, tracking and control handheld device 121d, a video camera 131, a laptop 133, a digital camera 135, a cell phone 137, a set-top-box 141, a television 139, a router 143, a laptop 151, a cellular network 161, a bridge 163 and the Internet 153.

The video camera 131, laptop 133, digital camera 135, cell phone 137, set-top-box 141 and television 139 are exemplary endpoint communication devices that each, comprise a unique device ID that is protected against erasure, editing or replacement. The endpoint devices are collectively referred to as endpoint devices 131-141. Each of the endpoint devices 131-141 comprise suitable logic, circuitry and/or code that are enabled to communicate via a one or more of a plurality of communication technologies. For example, the endpoint devices 131-141 are enabled to communicate via wireless, wire-line and/or optical media and utilize any suitable communications protocol. In addition, the endpoint devices 131-141 comprise a plurality of communication interfaces, for example, long, medium or short range wireless technologies. These wireless technologies comprise, for example, cellular, wireless LAN and/or Bluetooth respectively. Moreover, the endpoint devices 131-141 are monitored by one or more tracking and control servers and/or handheld device 121a, 121b, 121c and 121d. In this regard, various resources within the endpoint devices 131-141, for example, cameras, sound recording, key entry, display, speakers and/or communication circuitry perform operations for the monitoring based on resident target control software and input from the one or more tracking and control servers 121.

In various embodiments of the invention, the remotely triggered resource activity operates transparent to a user handling the endpoint devices 131-141. Also, the unique device ID is stored within secure memory within the devices 131-141. The protected unique ID will enable secure control and/or management of the one or more devices 131-141 by an authorized user, for example, a governmental authority or the owner of a device. In this regard, the devices 131-141 are utilized for covert surveillance. For example, activity occurring within an environment surrounding the device 131-141 and/or activity engaged in via operations handled by the device 131-141 may be monitored by an authorized user via the one or more tracking and control servers and/or device 121. In this regard, a camera on the device 131-141 may be activated and the camera may communicate pictures of the user and/or surrounding environment, without the knowledge of the user of the device 131-141, to another device such as a handheld communication device and/or a tracking and control server 121.

The cellular phone 137 comprises suitable logic, circuitry and/or code that are operable to set up voice calls and/or data sessions via the cell network 161 and/or bridge 163. For example, the cellular phone 137 accesses the Internet 153 and/or other networks via the cell network 161 and bridge 163. In various embodiments of the invention, the cellular phone 137 is enabled to communicate via a wireless LAN connection and the router 143 with the Internet 153 and/or other networks. In addition, the cellular phone 137 may have a Bluetooth interface for short range wireless communication with another device for example. The cellular phone 137 is communicatively coupled with one or more tracking and control servers 121a, 121b and/or 121c via one or more paths such as via the cellular network 161, the bridge 163 and the Internet 153 or the router 143 and the Internet 153. Furthermore, the cellular phone 137 may comprise a GNSS receiver such as GLONASS receiver and/or GPS, receiver and/or may be enabled to determine its geographic location by network assisted and/or autonomous methods. In some embodiments of the invention, the GNSS receiver is coupled to the cellular phone 137 via a wired or wireless connection. The cellular phone 137 comprises a unique ID that is stored within secure memory, for example, a one time programmable (OTP) memory. In addition the cellular phone 137 comprises suitable logic, circuitry and/or code to enable operation of various internally and/or externally coupled resources, based on control from a remote entity such as the tracking and control servers 121 or the handheld device 121d. For example, cameras, sound recording, key entry, display, speakers and/or communication circuitry within and/or coupled to the cellular phone 137 operate based on resident target control software and/or control information received by another device such as the tracking and control server 121 and/or another handheld communication device 121d.

The digital camera 135 and the video camera 131 comprise suitable logic, circuitry and/or code that is enabled to capture still and/or moving digital images and to store image data. In addition, the digital camera 135 and the video camera 131 are enabled to upload and/or download image data files to the Internet 153, for example, via the laptop 133 and/or the router 143. The digital camera 135 and the video camera 131 are communicatively coupled to one or more of the tracking and control servers 121a, 121b and 121c via the laptop 133, the router 143 and the Internet 153. Furthermore, the digital camera 135 and/or video camera 131 comprise a GNSS receiver such as a GPS receiver and/or GLONASS receiver, and/or are enabled to determine a geographic location by network assisted and/or autonomous methods. In some embodiments of the invention, the GNSS receiver is coupled to the cellular phone 137 via a wired or wireless connection. The digital camera 135 comprises a unique ID that is stored within secure memory. In addition the digital camera 135 comprises suitable logic, circuitry and/or code to enable operation of various internal and/or coupled resources, based on control from a remote entity such as the tracking and control servers 121. For example, image capture, camera control entry, display, and or communication circuitry comprised within and/or coupled to the digital camera 135 is controlled remotely.

The set-top-box 141 and television 139 comprise suitable logic circuitry and/or code to enable reception of video and/or audio data via the Internet 153 and/or router 143, via a cable service and/or via satellite for example. The set-top-box 141 and/or television 139 exchange control data with for example a multi-media network head-end via the router 143 and/or the Internet 153. In addition, the set-top-box 141 and/or television 139 are communicatively coupled to one or more tracking and control servers 121a, 121b and 121c via the router 143 and/or internet 153 for example. Furthermore, the set-top-box 141 and/or television 139 comprise a GNSS receiver such as a GPS receiver and/or GLONASS receiver, and/or are enabled to determine a geographic location by network assisted and/or autonomous methods. The set-top-box 141 and television 139 comprises a unique ID that is stored within secure memory. In addition the set-top-box 141 and television 139 comprises suitable logic, circuitry and/or code to enable operation of various internal and/or coupled resources, based on control from a remote entity such as the tracking and control servers 121. For example, video recording and/or displaying, key and/or human interface entry, speakers and or communication circuitry within and/or coupled to the set-top-box 141 and television 139 are operable so they are locally and/or remotely controlled.

The laptop 151 is a computing device that comprises suitable logic circuitry and/or code to communicate via one or more communication interfaces and is enabled to communicate via one or more wireless and/or tethered communication technologies with the internet 153. The laptop 151 comprises a user interface that enables a user to access one or more of the tracking and control servers 121*a*, 121*b* and 121*c* and to interface with tracking and control server functionality. The laptop 151 is communicatively coupled with one or more of the tracking and control servers 121 via the internet 153 and/or other communication network facilities. Notwithstanding, the invention is not limited to utilizing any specific device such as the laptop 151 for interfacing with the one or more tracking and control servers or device 121 and utilizes any suitable computing and/or communication device enabled to support a browser and/or non-browser user interface. For example, the laptop or other computing devices interface with the one or more tracking and control servers and/or device 121 via any suitable client server communication such as a java applet or command line interface and may communicate over a private network rather than the Internet The tracking and control servers 121*a*, 121*b*, 121*c* and the tracking and control handheld device 121*d* comprise suitable logic, circuitry and/or code to enable tracking and control and/or managing of one or more endpoint devices such as the video camera 131, the laptop 133, the digital camera 135, the cell phone 137, the set-top-box 141 and the television 139. In this regard, the tracking and control servers and device 121 are enabled to establish and configure a user account for an owner and/or authorized user of one or more of the endpoint devices 131-141. The tracking and control servers 121 have unique IP addresses and provides a secure interface for an owner and/or authorized user of the one or more of the endpoint devices 131-141 to register and/or manage the endpoint devices 131-141. For example, a plurality of tracking and control and/or management features for the one or more endpoint devices 131-141 comprises geographic location retrieval and/or location tracing of an endpoint device 131-141, determining usage history, disabling and/or enabling all or a portion of an endpoint device's functionality and/or communicating with an endpoint device 131-141 via a call and/or messaging with the device. In various embodiments of the invention, the tracking and control server and/or handheld device 121 is enabled to contact, for example, an owner of the one or more endpoint devices 131-141 in instances where a specified type of activity or behavior in the endpoint device is detected. For example, the tracking and control server and/or handheld device 121 is operable to send an email, SMS message, and/or a voicemail to the owner when a device is utilized outside of a specified geographical area.

Furthermore, the tracking and control servers 121*a*, 121*b*, 121*c* and/or the device 121*d* comprise suitable logic, circuitry and/or code to gain secure access to the one or more endpoint devices 131-141 and remotely activate control of various resources comprised within and/or coupled to the endpoint devices. For example, cameras, sound recording, key entry, display, speakers and or communication circuitry within and/or coupled to the one or more devices 131-141 can be controlled.

In various embodiments of the invention, only one tracking and control server or device 121 is available to manage the one or more endpoint devices 131-141. For example, an endpoint device may be managed by only one tracking and control server 121. In other embodiments of the invention, a plurality of tracking and control servers and/or handheld devices, 121*a*, 121*b*, 121*c*, 121*d* and/or other tracking and control servers are utilized to manage the endpoint devices 131-141. In addition, there are one or more service providers that offer an endpoint device management service and that utilize the one or more tracking and control servers and/or devices such as 121*a*, 121*b*, 121*c* and/or 121*d*. In various embodiments of the invention, the tracking and control servers and/or devices 121, and tracking and control software is utilized by a policing body, governmental body and/or by other authorized individuals. In addition, tracking and control server software is loaded on any suitable computing and/or communication device and utilized to manage and/or track one or more of the endpoint devices 131-141. For example, one or more authorized individuals are enabled to utilize tracking and control server software on their own computing device to manage one or more of the endpoint devices 131-141.

Information regarding one or more of the endpoint devices 131-141 and/or regarding an owner or authorized user of the one or more endpoint devices 131-141 is maintained by one or more of the tracking and control servers 121 service providers. For example, information such as unique endpoint 131-141 device IDs, SIM card IDs, endpoint device geographic locations, endpoint device status, multi-media data and/or usage history is communicated between tracking and control servers routinely and/or on an as need basis. In various embodiments of the invention, a centralized service is capable of maintaining device and/or user information and that shares the information with one or more of the tracker servers 121.

In operation, an owner or authorized user of one or more of the endpoint devices 131-141 purchases and/or registers for an endpoint device tracking and control service. An account is created on one or more of the tracking and control servers 121 for the owner and/or authorized user that enables the owner and/or authorized user to manage and/or control their one or more endpoint devices 131-141. The authorized user and/or owner provides security information such as a unique device ID for each of the managed and/or controlled endpoint devices and establishes a password for accessing the tracking and control server 121 functionality. In addition, an owner or authorized user profile can be created on the one or more tracking and control servers 121 according to "user" preferences. The profile enables configuration of security management and/or various management and/or tracking and control features for the one or endpoint devices 131-141. The authorized user and/or owner is enabled to gain secure access to the one or more tracking and control servers 121 via a user interface, for example a browser on the laptop 151. The user interface provides secure login and/or device management screens for activating and/or interfacing with the endpoint device tracking and control and/or management features. In some embodiments of the invention, the owner and/or authorized user accesses the tracking and control server 121 management and/or tracking and control screens via one or more of the endpoint devices 131-141, for example.

An authorized user and/or owner of one or more of the endpoint devices 131-141 may wish to engage in covert surveillance of one or more of the devices, for example, the cellular phone 137. In this regard, the authorized user and/or owner accesses the tracking and control server 121 management, tracking and control screens via the laptop 151. Via the tracking and control screens, the authorized user and/or owner requests the geographic location of the cellular phone 137. The tracking and control server 121 is enabled to communicate with the remote cellular phone 137 and retrieve the phone location and report it back to the authorized user and/or owner at the laptop 151. In addition, the authorized user and/or owner is provided with the capability to activate resources within and/or coupled to the cellular phone 137, for example, cameras, sound recording, key entry, display, speakers and or communication circuitry to monitor activity and/or retrieve gathered surveillance data. The cellular phone 137 communicates information gathered by the one or more resources to the one or more tracking and control servers 121. In this manner, an authorized user and/or owner is enabled to observe activity occurring in an environment surrounding the cellular phone 137.

In addition, any local control of the cellular phone 137 by a local user of the cellular phone 137 and/or resulting recorded data may be covertly monitored remotely by the authorized user and/or owner. For example, phone usage, image and/or sound capture, and/or Internet access are logged and/or communicated to the server 121. In various embodiments of the invention, a third party call may be established while the cellular phone is engaged in a call initiated by a local user. In this regard, the locally initiated call may be monitored and/or data may be delivered to the server 121. One or more local events in the cellular phone 137 may trigger activation of the surveillance activity. For example, sensed voice activity in the cellular phone 137 may trigger activation of image and/or sound capture by the mobile phone 137 and subsequent communication of surveillance data to the server 121. In this manner, an authorized user and/or owner of the endpoint devices 131-141 is provided with the capability to remotely control the one or more endpoint devices in order to stealthily gather information and/or multi-media data from the one or more devices. For example, in instances when an endpoint device is stolen, covert surveillance via the laptop 151 and/or server 121 may enable an owner and/or authorized user to determine where a stolen device is and/or who may have stolen it. In other exemplary embodiments of the invention, the covert surveillance may assist government authorities in locating a missing person and/or solving various crimes.

Figure 2:
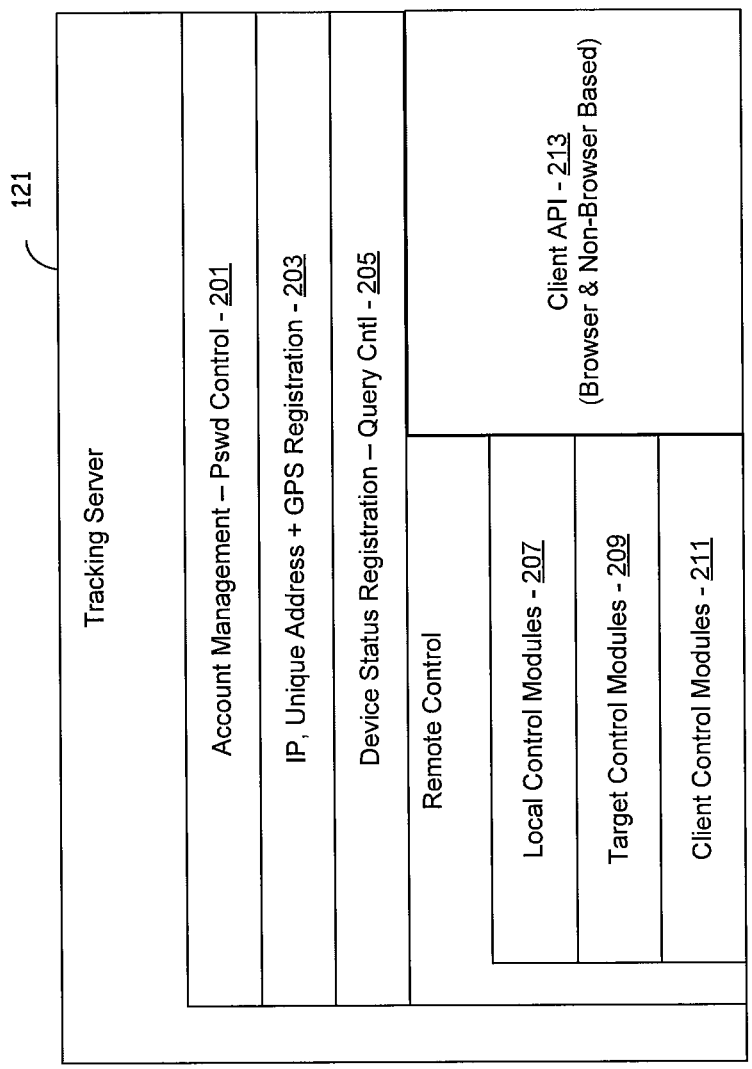
FIG. 2 is a block diagram illustrating an exemplary device tracking and control server, in accordance with an embodiment of the invention.

FIG. 2 is a block diagram illustrating an exemplary device tracking and control server, in accordance with an embodiment of the invention. Referring to FIG. 2, there is shown a tracking and control server 121, account management and password control function 201, IP, unique address and GPS registration function 203, device status and registration query control function 205, local control modules 207, target control modules 209, client control modules 211 and client API 213.

The tracking and control server 121 is similar and/or substantially the same as the tracking and control servers 121a, 121b and 121c, which are described with respect to FIG. 1.

The account management and password control function 201 of the tracking and control server 121 enables establishment and maintenance of an account for an owner and/or user of an endpoint device such as 131-141. The account management and password control function 201 enables storage and management of a user profile. Information in the user profile enables secure access to the tracking and control server 121 and configures device management and/or tracking and control features. An account is established and defined when a subscriber signs up for endpoint device tracking and control service. A password for accessing the endpoint device tracking and control service on the tracking and control server 121 may be assigned to an account owner and/or one or more users authorized to access the account. The authorized users and/or owner of the managed endpoint devices 131-141 is enabled to access the account as needed to modify the user profile. For example, the authorized user and/or owner is provided with the capability to activate remote control of the endpoint devices 131-141. In addition, ownership of the device is transferred to a new user by modifying the user profile and providing a password for access to the account to the new owner and/or user. In various embodiments of the invention, an authorized user, for example, a governmental or policing authority may need to establish an account for one or more specified endpoint devices 131-141. In this regard, the authorized user configures a profile for managing, tracking and/or controlling the one or more endpoint devices.

The IP, unique address and GPS registration function 203 controls communications between one or more of the endpoint devices 131-141 and one or more tracking and control servers 121a, 121b and 121c and/or handheld device 121d. In this regard, the one or more endpoint devices 131-141 routinely register with one or more of the tracking and control servers 121 when the endpoint devices are powered on. Also, the one or more of the endpoint devices 131-141 provide their DNS assigned temporary IP addresses to the one or more tracking and control servers 121. This enables communication between the one or more endpoint devices 131-141 and the one or more tracking and control servers 121. Exemplary communication from the one or more tracking and control servers 121 to the mobile phone 137 comprises a command to activate a video camera and to communicate multimedia data that is captured by the video camera to the server 121. In addition, when the one or more endpoint devices 131-141 registers with the one or more tracking and control servers 121, the endpoint devices report their geographic location which may be captured by the IP, unique address and GPS registration module 203. The captured geographic location of the mobile phone 137 may enable an authorized user and/or owner to locate an endpoint device for example.

The device status registration and query control function 205 manages the status of one or more endpoint devices 131-141. The device status registration and query control function 205 is utilized to enable storage of information from an authorized owner and/or user or from an endpoint device, that determines which management and/or tracking and control features are activated within the tracking and control server 121. In addition, the device status registration and query control function 205 is responsible for communicating with the endpoint devices 131-141. For example, an authorized user may access a tracking and control server 121 via a device management screen and set a status of an endpoint device. The status may indicate, for example, that the mobile phone 137 is stolen and under observation via image and/or sound capture. Based on a profile associated with a user, the device status registration and query control function 205 is operable to activate various management and/or tracking and control features. Exemplary tracking and control features within the cellular phone 137 comprise audio, image and/or geographic location capture. For example, cameras and/or sound recording resources on the cellular phone 137 are activated via the target control software resident on the cellular phone 137 and corresponding captured sound and/or imagery are communicated back to the one or more servers 121. The authorized user then determines where the cellular phone 137 is located and in some instances, identifies the person in possession of the cellular phone 137. Moreover, the authorized user or network operator is enabled to lock and/or disable the stolen mobile phone 137.

In various embodiments of the invention, in instances when an endpoint device such as 131-141 attempts to access the Internet 153, a challenge to the endpoint device's status is communicated. For example, when an endpoint device which is managed by one or more tracking and control servers 121, accesses the Internet 153, it communicates various information that may be utilized by the tracking and control server 121 to authorize Internet access for the endpoint device. In this regard, the endpoint device, for example the digital camera 135 communicates its unique device ID. The device status registration and query control function 205 determines that the status of the digital camera 135 is that it is stolen and as a result, instructs the digital camera 135 to capture image data from its location and communicate corresponding digital image files to the local control module of the tracking and control server 121. The tracking and control server 121 processes the image data and is enabled to download the image data to the laptop 151 for viewing by an authorized user. In another embodiment of the invention, the mobile phone 137 challenges its status by sending a device ID and SIM card ID. The device status registration and query control function 205 may then determine that the SIM card ID is not authorized to be utilized in the mobile phone 137 and inform an authorized user of a security breach.

The local control module 207, target control module 209 and/or client control modules 211 work together to manage and activate tracking and control service functionality. The local control module 207 is resident on the one or more tracking and control servers 121. The target control module 209 resides on the endpoint devices 131-141. All or a portion of the target control module 209 may be down loaded from a tracking and control server 121 via, for example, the laptop 151. Alternatively, the target control module 209 may be preloaded on the one or more endpoint devices 131-141. A vendor of a tracking and control service is enabled to modify a device and/or load the target control module 209, at a point of sale or an establishment of a tracking and control service account, In various embodiments of the invention, the target control module 209 may be loaded on an end point device 131-141 during manufacturing of the device. The target control module 209 is stored within the one or more endpoint devices such that it is difficult be deleted or disabled by a firewall for example. In this regard, the target control module 209 is stored in firmware, ROM or in flash memory within an endpoint device's communications chip set, for example. In various embodiments of the invention, the target control module may be stored in the one or more endpoint devices 131-141 below operating system (OS) software so that it is concealed from unauthorized users such as sophisticated programmers and/or hackers, attempting to gain access and/or modify the endpoint device. The target control module 209 is enabled to enforce and/or execute commands from the tracking and control server 121. For example, when the target control module 209 is resident on the cellular phone 137, the phone initiates a challenge and/or registers with the tracking and control server 121 and communicates its device ID and/or other security information. Based on the user profile and/or the status of the mobile phone 137, the local control module may communicate with the target control module resident on the mobile phone 137 to activate various resources such as simulated key entry, camera and microphone recording and/or wireless communication within the phone. Resulting gathered data is communicated to the tracking and control server 121.

The client control module 211 comprises a user interface that is downloaded to the laptop 151. The user interface comprises a web based browser and/or any other suitable client server user interface such as a Java based application. The user interface comprises screens for accessing the tracking and control server 121 and modifying user and/or device profiles and/or interfacing with tracking and control and/or management features. The client API 213 is a set of definitions, procedures and/or functions that enable the user interface on the laptop 151 to communicate parameters and/or call routines on the tracking and control server 121. The client control module 211 enables the owner and/or authorized user to configure and/or initiate remote control of the one or more endpoint devices 131-141 via the server 121.

In operation, a tracking and control service account is established for an owner and/or authorized user of one or more of a plurality of endpoint devices 131-141. The vendor of the tracking and control service account is enabled to load target control modules 207 on the endpoint devices 131-141. The vendor of the tracking and control service account configures the established account with unique device IDs from the endpoint devices 131-141 and other security parameters such as SIM card IDs and public key infrastructure public and/or private keys. The vendor provides the owner with an initial user name and/or password for access to the owner's account. In various embodiments of the invention, the vendor allocates a specific tracking and control server 121 to provide service to the owner of the one or more endpoint devices 131-141. The owner and/or authorized user is provided with the capability to download client control modules 211 to the owner and/or authorized user's laptop 151 from the tracking and control server 121 and/or utilize a web browser to access account management screens handled by the tracking and control server 121.

The owner and/or authorized user is also provided with the capability to configure various tracking and control and/or management features for the endpoint devices 131-141 and indicates the status of the endpoint devices. An exemplary status is that none of the endpoint devices 131-141 are missing. Notwithstanding, the owner configures the tracking and control service to maintain a history of geographic locations that are recorded when the endpoint devices 131-141 routinely register with the tracking and control server 121. In an instance where one or more of the endpoint devices 131-141 are missing, the owner may access the tracking and control server's account management screens and review the geographic location history to determine where the missing one or more endpoint devices 131-141 is located. In addition, the owner configures the tracking and control service to periodically capture images when the endpoint devices 131-141 are determined to be located outside of a specified geographic area. In instances when one or more of the endpoint devices 131-141 are missing, the owner may view the images via the account management screens to determine who may be in possession of the missing device.

In instances where an owner determines that the missing one or more endpoint devices 131-141 have been stolen, the owner has the capability to change a status of the missing endpoint devices to, for example, stolen and/or under observation. Subsequently, when an unauthorized user attempts to access the internet with one of the missing endpoint devices, for example, the laptop 133, the missing endpoint device 133 initiates a challenge to its own status on the server 121. In this manner, the server 121 is enabled to communicate with the missing laptop 133. The challenge will fail due to the laptop 133's status of stolen and/or under observation which is stored in the server 121. The target control module 209 stored within the laptop 133 and the local control module 207 within the server 121 takes action accordingly. Based on the resident target control module 209, the laptop 133 has the capability to activate one or more internal and/or coupled resources such as a camera and/or sound recording circuitry to monitor laptop activity and/or gather information about the laptop 133's surroundings. The laptop 133 is operable to transmit captured usage and/or multi-media data back to the server 121. In addition, an owner and/or authorized user of the laptop 133 is provided with the capability to securely access the communicated usage and/or multi-media data via the laptop 151 and the client module 211. In this manner, the owner and/or authorized user determine who stole or is in possession of the laptop 133.

Figure 3:
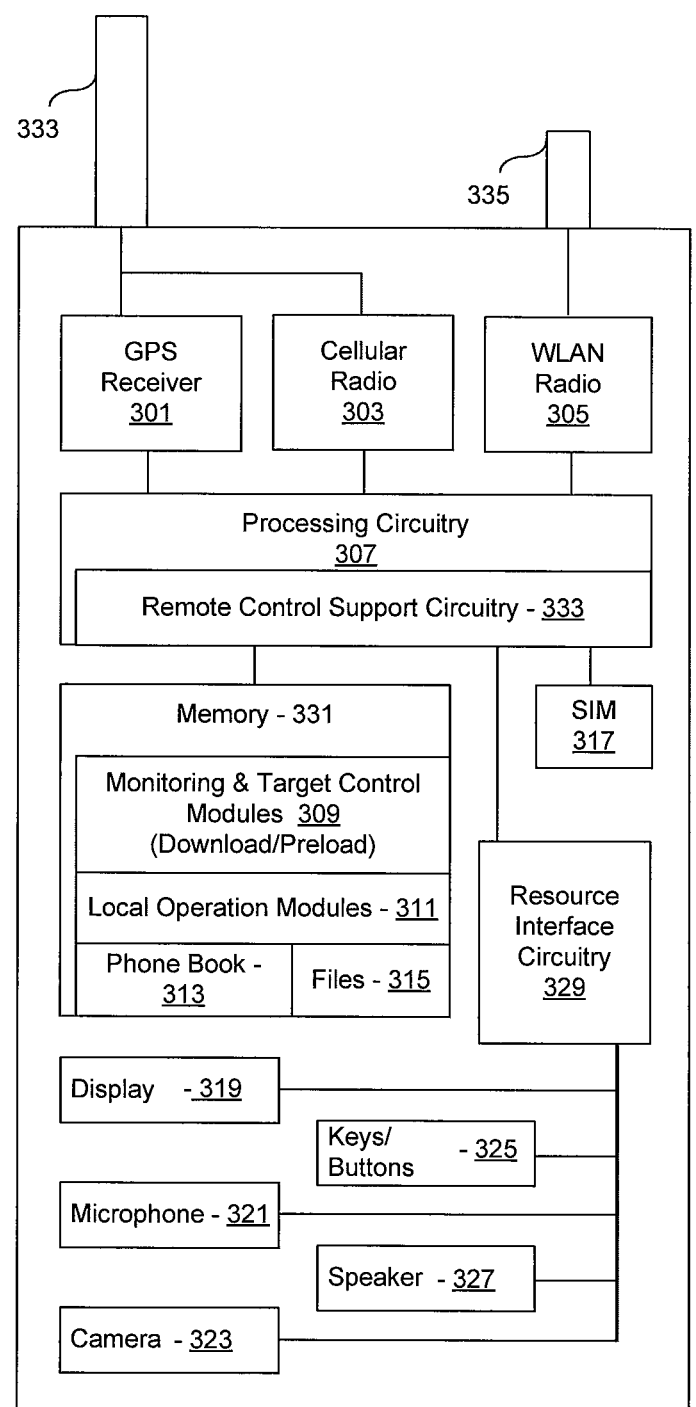
FIG. 3 is a block diagram illustrating an exemplary device enabled for security, tracking and control functionalities, in accordance with an embodiment of the invention.

FIG. 3 is a block diagram illustrating an exemplary device enabled for security, tracking and control functionalities, in accordance with an embodiment of the invention. Referring to FIG. 3, there is shown the mobile phone 137 comprising a GPS receiver 301, a cellular radio 303, a wireless local area network (WLAN) radio 305, processing module 307, remote control support circuitry 333, memory 331, monitoring and target control modules 309, local operation modules 311, phone book 313, files 315, display 319, microphone 321, camera 323, keys and buttons 325, speaker 327, resource interface circuitry 329, GPS and Cellular antenna 333 and WLAN antenna 305.

The mobile phone 137 is similar or substantially the same as the mobile phone described with respect to FIG. 1. The mobile phone 137 comprises a GPS receiver 301 which comprises suitable logic, circuitry and/or code to enable reception of GPS signals and determine a geographic location of the mobile phone 137. The mobile phone 137's geographic location is determined based on network assisted and/or autonomous methods for determining geographic location. Notwithstanding, the invention is not limited with regard to any specific type of geo-location technology and/or methods and may utilize any suitable technology and/or method for determining its location.

The cellular radio 303 comprises suitable logic circuitry and/or code to enable transmission and reception of RF cellular signals via the antenna 333. In addition, the cellular radio 303 is enabled to exchange signals with the processing module 307 for based band processing. The cellular radio 303 is not limited by any specific type of wireless technology and may utilize any suitable wireless technology, for example, GSM, CDMA, WCDMA, OFDMA, LTE and WIMAX.

The WLAN radio 305 may comprise suitable logic, circuitry and/or code to enable transmission and/or reception of RF signals for the communication of data traffic via the antenna 335. In addition, the WLAN radio 305 is operable to exchange data with the processing module 307 for based band processing. The WLAN radio 305 communication may be based on any suitable data communication standard such as various IEEE 802.11 and/or Wi-Fi Alliance standards.

The processing module 307 comprises suitable logic, circuitry and/or code to enable processing of base band communication signals as well to support endpoint device tracking and control function for the mobile phone 137. The processing module 307 comprises one or more general purpose processors with various functionalities implemented in firmware and/or embedded special purpose processors. In some embodiments of the invention, the endpoint device tracking and control function is protected by secure communication operations. In this regard, the processing module 307 may comprise a security processor to control secure communication between the endpoint device and tracking and control servers 121 and/or an on-chip embedded CPU, which utilizes protected code, for example.

The remote control support circuitry 333 comprises suitable logic, circuitry and/or code to handle instructions for stealthy target resource control that is securely stored within the monitoring and control module memory 309. The remote control support circuitry 333 operates independent of the processing circuitry 307 and is inaccessible and/or hidden from a programmer and/or hacker accessing the processing circuitry 307 via an operating system or higher layer shell. For a high degree of protection and/or stealthy resource control, an exemplary embodiment of the remote control support circuitry 333 is operable to control various cellular phone 137 resources based on very low level microcode instructions. The remote control support circuitry 333 is operable to store and/or retrieve the microcode instructions to and/or from a high speed, read only control store, for example. In this regard, the microcode is not accessible or visible to a hacker and/or software programmer such as an assembler language programmer.

The SIM card 317 is a removable integrated circuit card that comprises suitable logic, circuitry and/or code operable to securely store a service subscriber key that is utilized to identify a service subscriber. The SIM card 317 is removable and may be removed from one device and utilized in another device and will identify the subscriber to a service provider from the other device for security and/or billing purposes. SIM card IDs that are authorized for an established tracking and control server account are registered with the tracking and control server. In the event that the mobile phone 137 is stolen and an unauthorized user's SIM card is detected, the tracking and control server and/or cellular phone 137 is operable to activate appropriate tracking service features for stolen phones.

The memory 331 comprises suitable logic, circuitry and/or code to provide storage for instructions and data for a plurality of covert tasks performed by the cellular phone 137. Regions of the memory 331 dedicated to phone tracking and control functionality are stored in secure memory technology. For example, the monitoring and target control modules 309 are implemented in secure and/or static memory such as ROM, firmware and/or on chip Flash memory. In this manner, unauthorized users are deterred from disabling the tracking and/or control function in the mobile phone 137. A unique device ID for the mobile phone 137 and/or a secure user key stored within the memory 331 are protected from modification or deletion by an unauthorized user. All or a portion of the target control modules 309 are pre-loaded into the secure memory. In various embodiments of the invention, all or a portion of the monitoring and target control modules 309 comprise the target control modules 209 that are described with respect to FIG. 2. In this regard, all or a portion of the target modules 209 are downloaded from the security processor 121 to one or more of the endpoint devices 131-141 such as the mobile phone 137.

The monitoring and target control modules 309 comprise instructions and/or data for monitoring activity on the cellular phone 137 and/or carrying out tracking and control tasks. The monitoring and target control modules 309 may log usage information, for example, calls made and/or data transmitted from the mobile phone 137 as well as determined geographic locations. In this regard, the log data may be transferred to the tracking and control servers 121. Moreover, monitoring and target control modules 309 are enabled to provide operation and/or control of cellular phone 137 resources via the resource interface circuitry 329. For example, the monitoring and target control modules 309 are enabled to control the camera 323, microphone 321, display 319, speaker 327, GPS receiver 301, cellular radio 303 and/or WLAN 305 radio activity. In addition, the target control modules 309 are enabled to simulate key and/or button 327 entry for controlling the cellular phone 137 via the resource interface circuitry 329. The monitoring and control modules 309 are enabled to capture information from the various resources via the resource interface circuitry 329 and to securely store and/or communicate the information to the server 121. Monitoring and control of the cellular phone 137 resources by the monitoring and target control modules 309 is transparent to a user and/or a programmer of the cellular phone 137.

The local operation modules 311 comprise instructions and/or data for carrying out communications, data processing and/or human to resource interface operations on the mobile phone 137. The phone book 313 provides storage for phone numbers and/or addresses utilized by users of the mobile phone 137. The files 315 region comprise user files such as multimedia files that a user stores on the mobile phone 137. The multi-media files are downloaded to the device and/or captured by one or more of human interfaces such as the microphone 321 or camera 323 for example.

The mobile phone 137 comprises a plurality of resources that are utilized for capturing communication information and for interfacing with various features within the cellular phone 137. For example the mobile phone comprises the display 319 and speaker 327 that are operable to produce images and/or sound for cellular communication or for rendering stored multi-media files for example. The microphone 321 and camera 323 are utilized for voice calling and/or for capturing and storing multi-media data. The keys and/or buttons comprise a keyboard and/or number entry for creating messages and/or interfacing with cellular phone 137 features. In various embodiments of the invention, other types of human interfaces may be utilized. For example, touch screen, voice and/or pressure sensors are utilized for inputting information.

In operation, information enabling secure communication between the cellular phone 137 and tracking and control server 121 are configured within the cellular phone 137 and within the tracking and control server 121. For example, a unique and/or secure device ID for the cellular phone 137 and a SIM card ID for the subscriber of the tracking and control service are stored in the cellular phone 137 and the tracking and control server 121. In addition, an IP address for the tracking and control server 121 is stored in the cellular phone 137. When the cellular phone 137 is activated and attempts to make a call or access the internet, it registers with the tracking and control server 121 via the antenna 333, the cell network 161 and bridge 163 or via the WLAN antenna 305, router 143 and internet 153. The tracking and control server 121 authenticates the cellular phone 137 based on one or more of its unique device ID and its resident SIM card ID and checks the cellular phone 137's status. The cellular phone 137 reports its location and/or call history information and challenges its status with the tracking and control server 121. The tracking and control server communicates the status of the cellular phone 137 and/or any commands and/or requests for data. In this regard, various exchanges may occur between the mobile cellular 137 and the tracking and control server 121 based on the status of the cellular phone 137, user preferences and/or tracking and control server 121 features.

An exemplary usage scenario for managing, tracking and control and/or monitoring an endpoint device such as the cellular phone 137 comprises instances when the cellular phone 137 is missing and the owner wishes to determine whether it is simply misplaced or if it was stolen. The owner may access the tracking and control server 121 management screens and may request the geographic location of the cellular phone 137. In instances when the cellular phone 137 is misplaced, the user may simply locate the phone and retrieve it. In instances when the owner determines that a phone was stolen, the owner may retrieve its geographic location and/or call or messaging history. The owner may let a stolen phone continue to operate so that covert surveillance may be performed by the cellular phone 137 and one or more of the servers 121. In this regard the owner and/or an authorized user is provided with the capability to modify the status of the cellular phone 137 and/or configure various surveillance features on the tracking and control server 121 via the laptop 151. As a result, the owner and/or authorized user is provided with the capability to receive video captured by the cellular phone 137 at the laptop 151 and to determine who has stolen the cellular phone.

In another exemplary usage scenario, the cellular phone 137 is shared by members of a family and/or given to a child to use. In the event that, for example, the child is missing, the owner or authorized user of the tracking and control service accesses the tracking and control server 121 management screens and gathers geographic location history and/or phone usage logs. The tracking and control server periodically locates the phone and/or retrieves phone usage events. In addition, police and/or other government agents may be given authorization to access the tracking and control server 121 and configure various surveillance features on the cellular phone 137. The police and/or other government agents are then enabled to utilize surveillance data from the cellular phone 137 to investigate the case of the missing child.

Figure 4:
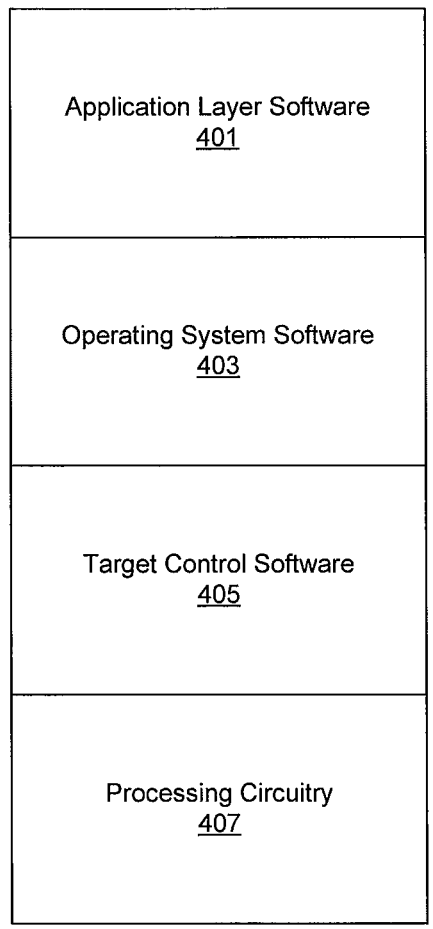
FIG. 4 is a block diagram illustrating an exemplary concealed tracking and control function within an endpoint device, in accordance with an embodiment of the invention.

FIG. 4 is a block diagram illustrating an exemplary concealed tracking and control function within an endpoint device, in accordance with an embodiment of the invention. Referring to FIG. 4, there is shown, an application layer 401, an operating system 403, target control software 405 and processing circuitry 407.

The application layer 401 comprises application software comprising suitable logic and/or code that is operable to implement cellular phone 137 operations that are initiated by a local phone user and/or service provider network system. The application layer 401 runs on the processing circuitry 407 and is enabled to control various resources within the cellular phone 137. For example, one or more of the cellular radio 303, WLAN radio 305, GPS receiver 301, SIM 137 and resource interface circuitry 329 are controlled by the application layer 401. In addition, the application layer 401 is operable to control the camera 323, microphone 321, display 319 and/or speaker 327. Moreover, the application layer 401 is operable to handle baseband processing for communication data received and/or transmitted via the cellular radio 303 and/or WLAN radio 305. In various communication devices, an authorized and/or unauthorized software programmer may discover a way to gain access to the application layer 401. In this regard, the application layer 401 software is vulnerable to modification by an individual such as a hacker and/or unauthorized programmer who may attempt to modify and/or disable application software.

The operating system (OS) software 403 comprise suitable logic and/or code that is operable to function as a host to the application layer. The OS software 403 handles coordination of activities and manages access to hardware resources within the cellular phone 137 based on system calls from the application layer. In addition, the OS software 403 is accessible to a sophisticated software programmer attempting to disable tracking and/or monitoring capability within the cellular phone 137. In this regard, an unauthorized programmer or hacker may discover a way to breach security and gain access to OS software 403 via an OS software 403 user interface.

The target control software 405 comprises suitable logic and/or code that is operable to handle coordination of tracking and/or control operations for covert surveillance by the mobile phone 137. In this regard, activities for various hardware and/or software resources within the cellular phone 137 are be controlled by the target control software 405. The target control software 405 is hidden below the OS software 403 and may not be accessible to a programmer via a higher layer user interface. For example, the target control software 405 is protected from individuals such as a hacker or unauthorized user attempting to disable the target control software 405 and therefore attempting to disable the tracking and monitoring capabilities within the cellular phone 137. In addition, a sophisticated user of the cellular phone 137 may not detect activity by various resources that are described with respect to FIG. 3 in instances when the various resources are handled by the target control software 405. For example, activity may go undetected within the GPS receiver 301, cellular radio 303, WLAN radio 305, processing module 307, remote control support circuitry 333, memory 331, display 319, microphone 321, camera 323, keys and buttons 325 simulation and resource interface circuitry 329.

The processing circuitry 405 is similar or substantially the same as the processing module 307, resource interface circuitry 329 and/or remote control circuitry 333 that were described with respect to FIG. 3.

In operation, the application layer software 401 runs according to local control and/or input by a local user of the cellular phone 137 and/or other endpoint devices 131-141 via one or more user interfaces such as the keys and/or buttons 325, microphone 321 and/or camera 323. The application layer software 401 handles communications intended for the local user via the cellular radio 303, WLAN radio 305 and/or GPS receiver 301. In addition, the application layer 401 processes multimedia data and/or baseband voice data according to operations managed and/or known to a local user. The OS software 403 hosts the application layer software 401 and handles system calls from the application layer 401 for the processing circuitry 407.

The target control software 405 that is hidden below the OS software 401 layer controls covert tracking and/or monitoring activity within the cellular phone 137. For example, the target control software 405 controls various cellular phone 137 resources via the resource processing circuitry 407. In this regard, the target control software 405 controls the camera 323, microphone 321, display 319, speaker 327, GPS receiver 301, cellular radio 303 and/or WLAN 305 radio activity. In addition, the target control software 405 simulates key and/or button 327 entry for controlling the cellular phone 137 via the processing circuitry 407. The target control software 405 controls capture of information from the various cellular phone 137 resources via the processing circuitry 407 and stores it and/or communicates it to the tracking and control server 121. The captured information may be stored securely. Activity controlled by the target control software 405 is transparent to a user and/or a programmer of the cellular phone 137.

Figure 5:
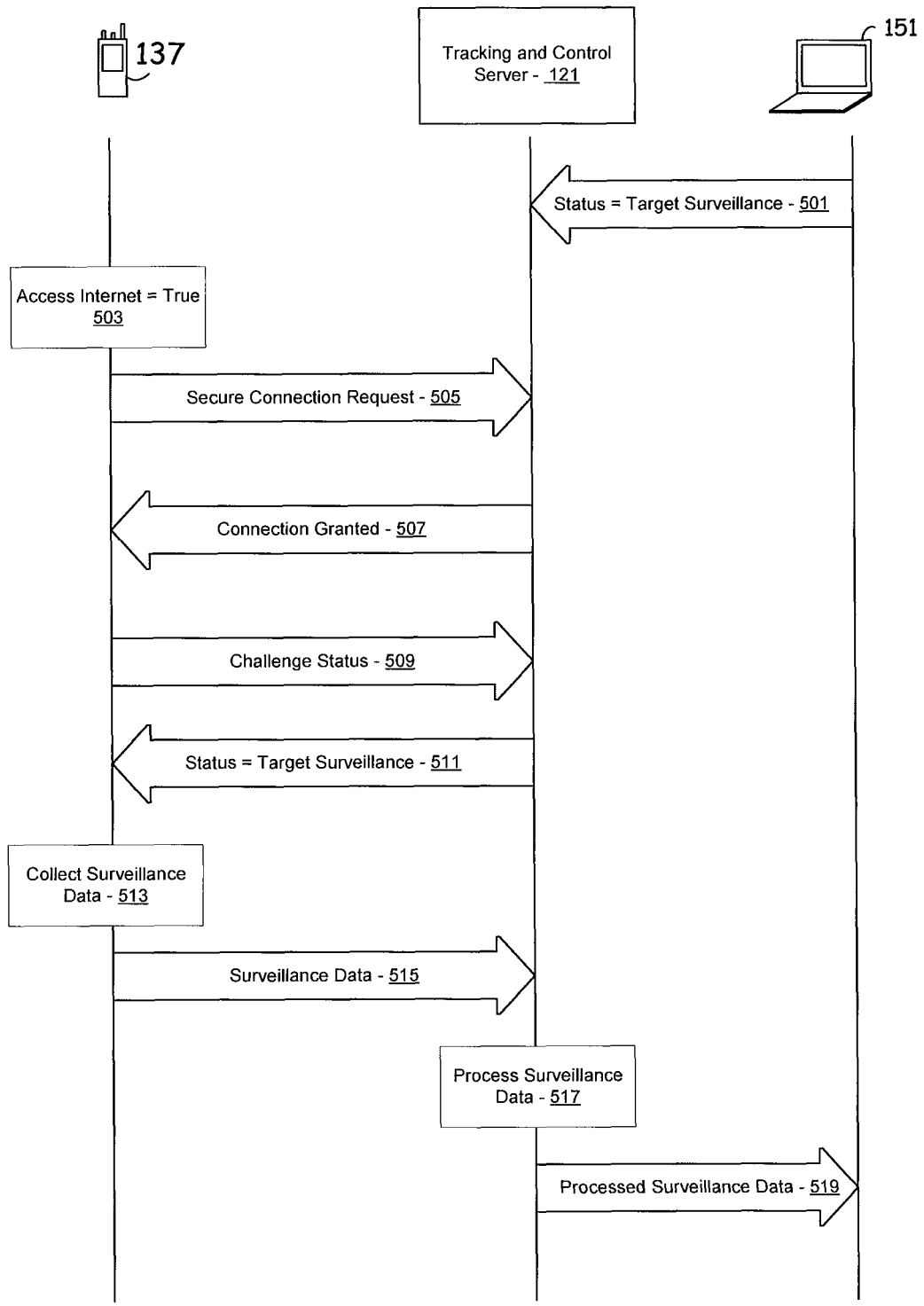
FIG. 5 is a flow diagram illustrating exemplary steps for implementing surveillance of an endpoint device, in accordance with an embodiment of the invention.

FIG. 5 is a flow diagram illustrating exemplary steps for implementing surveillance of an endpoint device, in accordance with an embodiment of the invention. Referring to FIG. 5, there is shown the cellular phone 137, the server 121 and the laptop 151.

The cellular phone 137 shown in FIG. 5 is an exemplary endpoint device that is similar and/or substantially the same as the cellular phone 137 described with respect to one or more of FIGS. 1, 2, 3 and 4, for example. The invention is not limited to any specific type of endpoint device and may comprise any suitable endpoint device, for example, one or more of the endpoint devices 131-141. The server 121 and the laptop 151 are described with respect to FIGS. 1, 2, 3 and 4.

Prior to initiating surveillance of an endpoint device in step 501, executable code is installed on the cellular phone 137, which may be without knowledge of a user of the cellular phone, to enable controlling and/or monitoring the phone and/or its environment.

In step 501, an owner of the cellular phone 137 and/or someone authorized to interface with the tracking and control server 121 may securely access the tracking and control server 121 with a user password via a user interface on the laptop 151. The owner and/or authorized user may change a status of the cellular phone 137 within the server 121 via the laptop 151. The status may indicate that the cellular phone 137 shall be a target of surveillance. For example, the cellular phone is operable to provide surveillance data and to activate various resources to capture the surveillance data. In this regard, the camera 323, microphone 321 and GPS receiver 301 within the cellular phone 137 are utilized to capture surveillance data. Furthermore, a user of the cellular phone 137 is unaware of the capture and/or communication of surveillance data. Resource activity may be transparent to the user of the cellular phone 137. In this regard, indicators of resource activity are not utilized. For example as images are captured by the camera 323 and audio is captured by the microphone 321, the captured images and/or audio may not be displayed. Also, lighting and/or sounds that may normally indicate resource activity such as clicking a photograph or depressing buttons may be suppressed.

In step 503, a local user of the cellular phone 137 initiates access to a server on the Internet 153. In step 505, prior to accessing the server on the Internet 153, the cellular phone 137 requests secure access to the server 121 and passes its unique device ID and temporary IP address to the server 121. In step 507, the server 121 authenticates and grants access to the cellular phone 137. In step 509, the cellular phone 137 sends a challenge to the server 121 to determine its status and/or mode of operation. In step 511, the server 121 returns a status of target surveillance indicating which action the cellular phone 137 should take. In step 513, in accordance with the received status, the cellular phone is operable to coordinate and/or enable camera, microphone and/or GPS receiver data collection. In step 515, the collected image, sound and/or location data may be sent to the server 121. In step 517, the image, sound and/or location data may be processed by the server 121. In step 519, the owner and/or authorized user may receive the processed image, sound and/or location data at the laptop 151.

In an embodiment of the invention, a first communication device, for example, a tracking and control server 121, may control interface resources, for example the GPS receiver 301, cellular radio 303, WLAN radio 305, display 319, microphone 321, camera 323, keys and buttons 325 and/or speaker 327 on a handheld communication device, for example the video camera 131, laptop 133, digital camera 135, cell phone 137, set-top-box 141, television 139, router 143, to monitor one or more operations handled by the handheld communication device. In this regard, the monitoring may be transparent to a user of the handheld communication device. The monitoring is operable to occur without knowledge of a user of the handheld communication device. An owner of said first communication device installs executable code on the handheld communication device, without knowledge of the user of the handheld communication device, to enable the controlling and monitoring.

The handheld communication device, for example, the cell phone 137 may be accessed by a unique identifier of the device. In addition, the unique identifier may be securely stored within the handheld communication device 137. The controlling of the handheld device 137 may be protected or access restricted. Furthermore, during the monitoring, control of one or more of the interface resources, for example, the camera 323 on the handheld communication device by a user of the device may be restricted. One or more functions which operate on the handheld communication device 137 for the monitoring may prevent unauthorized interruption of the monitoring. The first communication device, for example the server 121, may remotely control one or more devices on the handheld communication device 137, for example, the camera 323, microphone 321, a GPS receiver 301, input device 325, display 319, speaker 327, wireless and/or wire-line transmitter and/or receiver 303 and/or 305. The remote controlling of the one or more devices may be based on a profile, for example, a user profile and/or a device 137 profile. The first communication device 121 may receive monitored information from the handheld communication device 137 in response to the controlling of interface resources for example, the camera 323, microphone 321, a GPS receiver 301, input device 325, display 319, speaker 327, wireless and/or wire-line transmitter and/or receiver 303 and/or 305. The received monitored information may comprise an identity of the handheld device 137. The monitored information may be received from the device whenever the device is communicatively coupled to a communication network, for example, the internet 123 and/or the cell network 161. In addition, the one or more devices on the handheld device 137 may be configured to communicate information related to a detected activity, for example, motion, sound, user input, video, touch and/or audio to the first communication device 121. The user input may comprise speech, voice, touchscreen, keyboard input and/or keypad input. In this manner, a first communication device 121 may remotely control resources on a handheld communication device 137. In accordance with various embodiments of the invention, the first communication device may be a server 121 and/or another handheld communication device 121d. The first communication device 121 may be operable to cause monitored information to be stored on the handheld communication device 137. In this regard, the stored monitored information may be received from the handheld communication device 137 by the first communication device 121.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for enabling remote and anonymous control of mobile and portable multimedia devices for security, tracking and recovery.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   at a server system,
      receiving an indication message from a user, the indication message including an identifier of an access device to be monitored for unauthorized use by an unauthorized user of the access device and identification of activity of the access device to be monitored, the user being an owner or authorized user of the access device;
      receiving from the access device a secure unique identifier of the access device, the unique identifier being securely stored on the access device under control of the user and being independent of a network access identifier for the access device;
      authenticating the access device based on the received identifier of the access device from the user and the received unique identifier from the access device; and
      in response, providing to the access device commands for execution by the access device for monitoring activity of the access device.

2. The method of claim 1 wherein providing commands for execution comprises:
   providing commands to cause the access device to report its location.

3. The method of claim 1 wherein providing commands for execution comprises:
   providing commands to cause the access device to initiate a communication.

4. The method of claim 1 wherein providing commands for execution comprises:
   providing commands to cause the access device to register with the server system.

5. The method of claim 1 wherein providing commands for execution comprises:
   providing commands to cause the access device to activate one or more resources of the access device.

6. The method of claim 5 wherein providing commands comprises providing commands to cause a camera of the access device to produce image data and to cause the access device to communicate the image data to the server.

7. The method of claim 5 wherein providing commands comprises providing commands to simulate key entry to control the access device.

8. The method of claim 1 further comprising:
   providing a secure interface for access by the user;
   receiving registration communications from the user identifying the user;
   establishing a secure account for the user; and
   receiving device management commands from the user for managing the access device including receiving the indication message.

9. The method of claim 8 further comprising storing status data for the access device and wherein receiving device management commands comprises receiving a command from the user to change the status data to indicate that the access device should be a target of monitoring.

10. The method of claim 9 wherein receiving device management commands comprises receiving from the user commands to cause the server to communicate the commands for execution by the access device for monitoring activity of the access device.

11. A server system comprising:
a user interface for secure access over a network by users to receive from the users information defining remote control of one or more access devices and information defining respective unique identifiers for each respective access device of the one or more access devices;
a communication interface for communication with the one or more access devices;
data defining a user account associating a respective user with one or more respective access devices based in part on the information defining the respective unique identifiers provided by the respective user for each respective access device of the one or more access devices;
code to gain secure access via the communication interface to the one or more respective access devices and to receive from the one or more respective access devices respective unique device identifiers which have been securely stored on the respective access devices under control of the respective user for each respective access device of the one or more access devices;
code to remotely control via the communication interface resources of the one or more respective access devices in response to the information defining remote control and the received respective unique device identifiers and the respective unique identifiers for each respective access device of the one or more access devices.

12. The server system of claim 11 further comprising:
code to initiate a communication to a user when a specified type of activity or behavior in an access device associated with the user is detected by the server system.

13. The server system of claim 12 wherein the code to initiate the communication comprises code to cause the server system to contact the user.

14. The server system of claim 12 wherein the code to initiate the communication comprises code to cause the access device to initiate the communication to the user.

15. The server system of claim 11 wherein the user interface comprises a local control module to cooperate with a client control module of a device operated by a user to view and modify the data defining a user account.

16. The server system of claim 15 wherein the local control module is further operative to receive from the client control module information defining resources of an associate access device and control of the resources.

17. The server system of claim 11 wherein the code to gain secure access to the one or more respective access devices comprises code to receive a secure identifier stored inaccessibly on an access device and compare the received secure identifier with the data defining the user account and authenticate the access device.

18. A method comprising:
at a tracking and control server,
receiving from a user device over a network a communication identifying an access device associated with a user of the user device as a target of surveillance;
receiving from the access device a request for secure access to the server system, the request including identifying information for the access device;
authenticating the access device in response to the request;
receiving a challenge communication from the access device;
in response to the received challenge, communicating a status of target surveillance to the access device;
receiving from the access device surveillance data; and
communicating information about the surveillance data to the user device.

19. The method of claim 18 wherein communicating a status of target surveillance to the access device comprises communicating control instructions to the access device, the control instructions to cause the access device to report the geographic location of the access device to the tracking and control server.

20. The method of claim 18 wherein communicating a status of target surveillance to the access device comprises communicating control instructions to the access device, the control instructions to cause the access device to disable at least a portion of the access device.

* * * * *